United States Patent
Mirov et al.

[19]

[11] Patent Number: 6,138,236
[45] Date of Patent: *Oct. 24, 2000

[54] METHOD AND APPARATUS FOR FIRMWARE AUTHENTICATION

[75] Inventors: Russell Norman Mirov, Los Altos; Gregory Charles Onufer, Sunnyvale, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/674,026

[22] Filed: Jul. 1, 1996

[51] Int. Cl.$^7$ .............................. G06F 11/30; H04L 9/00
[52] U.S. Cl. ........................................... 713/200; 713/202
[58] Field of Search ..................... 713/200, 201, 713/202, 155, 161, 180; 380/282, 281

[56] References Cited

U.S. PATENT DOCUMENTS

| | | |
|---|---|---|
| 5,448,045 | 9/1995 | Clark ........................................ 235/382 |
| 5,481,612 | 1/1996 | Campana et al. ........................... 380/25 |
| 5,535,409 | 7/1996 | Larvoire et al. .......................... 395/800 |
| 5,537,540 | 7/1996 | Miller et al. ........................ 395/183.14 |
| 5,586,327 | 12/1996 | Bealkowski et al. ..................... 395/652 |
| 5,621,796 | 4/1997 | Davis et al. ............................... 380/24 |
| 5,633,930 | 5/1997 | Davis et al. ............................... 380/24 |
| 5,643,086 | 7/1997 | Alcorn et al. .......................... 380/25 X |
| 5,768,382 | 6/1998 | Schneier et al. ........................... 380/23 |

*Primary Examiner*—Dieu-Minh T. Le
*Attorney, Agent, or Firm*—Park & Vaughan LLP

[57] ABSTRACT

An apparatus for firmware authentication and methods of operating the same result in software upgradability to firmware without compromising the integrity of the firmware. The apparatus for firmware authentication of a boot PROM comprises a software programmable data section having a plurality of micro-code. An authentication section having a hash generator configured to generate a data hash in response to the plurality of micro-code programmed in the software programmable data section to authorize execution of the plurality of micro-code of the data section.

17 Claims, 4 Drawing Sheets

METHOD AND APPARATUS FOR FIRMWARE AUTHENTICATION

BACKGROUND OF THE INVENTION

1. Field of the Invention

The present invention relates to authentication of programmed micro-code and more particularly to confirm the integrity of programmable micro-code written in a memory device.

2. Description of the Related Arts

Computer systems during initial power up rely on a sequence of instructional routines which build on each previously executed instructional routine until the computer system is initialized. Micro-code, also referred to as firmware or boot code, is the first level of the instructional routines that are executed when the computer system is initially powered up. The micro-code stored in non-volatile memory devices such as a memory IC (integrated circuit) directs the computer system to certain boot blocks located on a disk drive. As these boot blocks on the disk drive are executed, successively larger blocks of boot data are loaded until finally the operating system, such as an Unix or Microsoft Windows of the computer system is loaded.

The micro-code for the initial boot up instructions of a computer system is typically stored in a boot ROM (read only memory) or boot PROM (programmable read only memory). An example of a PROM is a flash PROM, often referred to as flash memory. Needs arise when the micro-code for the initial boot up instructions requires updating. Those computer systems having ROMs require new ROMs. Replacing old ROMs with newly supplied ROMs is expensive. Furthermore, the computer system has to be disassembled to gain access to replace the ROMs.

In computer systems with boot PROMs that employ flash technology, updating new micro-code entails accessing the flash PROM using software and programming the flash PROM with new micro-code. However, because the micro-code contained in the boot PROM is the first code that is executed, reasons to limit programming access to the flash PROM include: 1) inadvertent programming can cause the computer system become completely inactive; 2) security sensitive environments require that the micro-code be tamper-proof to prevent security risks. Thus, safeguards are currently in place to prevent modification of the boot PROM.

These safeguards include using boot ROMs to store the micro-code or setting hardwire jumpers that prevent software modification of boot PROMs. In order to modify the micro-code, boot ROMs must be replaced with new boot ROMs containing the updated micro-code. In the case of boot PROMs, user intervention is required to manually switch the jumpers of the boot PROMs to enable programming access to the boot PROMs for the new micro-code. In either case, user intervention is required to physically open the computer system and make the necessary changes. The changes range from the replacement of old boot ROMs with new boot ROMs to changing jumper settings of the flash boot PROM to enable and disable programming of the flash boot PROM. Thus, the safeguards require additional time and effort from the users to implement modifications to the micro-code. The process of providing upgrades to the micro-code programming is cumbersome and time-consuming.

Therefore, it is desirable to provide an apparatus for authenticating firmware programmed in a boot PROM and methods of operating the same that enable programming access to the boot PROM without compromising the authenticity of the firmware that overcome the disadvantages of disassembling the computer system.

SUMMARY OF THE INVENTION

The present invention provides an apparatus for firmware authentication and methods for operating the same which result in software upgradability to firmware without compromising the integrity of the firmware. The novel application for authentication of firmware is based on cryptography. Thus, according to one aspect of the invention, a boot PROM (programmable read only memory) having programming instructions for initiating a computer system is provided. A software programmable data section has a plurality of micro-code. An authentication section having a hash generator generates a data hash in response to the plurality of micro-code programmed in the software programmable data section to authorize execution of the plurality of micro-code of the data section.

According to another aspect of the invention, the software programmable data section includes a predetermined digital signature, and the authentication section includes a predetermined public key and a decryptor which provides an verification hash in response to the predetermined signature and the public key. The authentication section also includes a comparator which compares the data hash with the verification hash to authenticate the plurality of micro-code of the software programmable data section. If the data hash and the verification hash do not match, a message alerts the user of the mismatch indicating that the micro-code is not authenticated.

According to another aspect of the invention, the authentication section includes a plurality of trusted micro-code which initiates execution of the plurality of micro-code of the software programmable data section in response to proper authentication of the data hash. The proper authentication of the data hash by the authentication section of the plurality of trusted micro-code affords the plurality of micro-code programmed in the software programmable data section to a level of trusted code. Thus, the trusted code of the software programmable data section can be used to authenticate another set of downstream code that is executed during the boot up sequence for the computer system.

According to yet another aspect of the invention, the software programmable data section includes a flash memory which enables software reprogramming of the plurality of micro-code. Other programmable storage mediums are also usable for the storage of the micro-code. The authentication section includes a ROM (read only memory) that provides a base line for trusted code.

An apparatus and method for firmware authentication are provided by authenticating the software programmable data section of the boot PROM with a trusted ROM section of the boot PROM. The ability to provide software programmability of the boot PROM affords ease in upgradability that saves time, effort, and energy. Upgrading with newer versions of the boot PROM affords support for new functions and eliminates bugs and other inconsistencies that can plague older versions of the boot PROM. Thus, the newer boot PROMs provide for a smoother and more efficient operating computer system.

Other aspects and advantages of the present invention can be seen upon review of the figures, the detailed description, and the claims which follow.

DETAILED DESCRIPTION OF THE INVENTION

Figure 1:
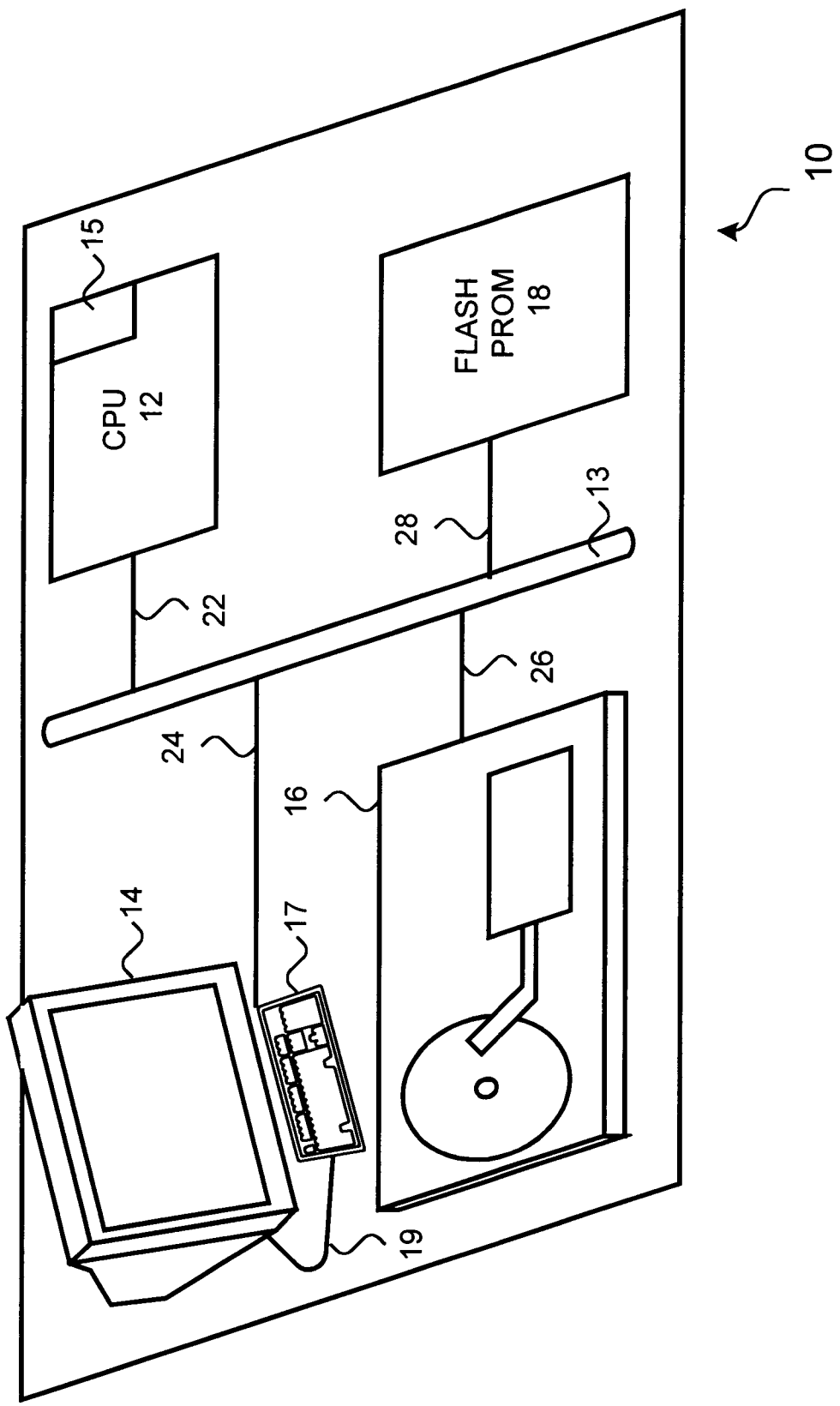
FIG. 1 illustrates a system level block diagram of a computer system.

The invention will be described with respect to the Figures in which FIG. 1 generally shows a simplified computer system 10. The computer system 10 includes a CPU (central processing unit) 12, display 14, hard disk 16 and a flash PROM (programmable read-only memory) 18. The computer system 10 is for illustrative purposes as many variations to the architecture of the computer system 10 are available and known in the art. CPU bus 22 couples the CPU 12 to data bus 13. The CPU 12 includes a memory 15 which stores instructions and data for processing by the CPU 12. Disk drive bus 26 couples the disk drive 16 to the data bus 13. The disk drive 16 provides non-volatile data storage for the computer system 10. Data transfers occur between the CPU 12 and the disk drive 12 as the data is processed by CPU 12. Display bus 24 couples the display 14 to the data bus 13. The display 14 receives output data for display. The display 14 includes a keyboard 17 coupled to the display via cable 19. The keyboard 17 provides an user interface to computer system 10. PROM bus 28 couples the flash PROM 18 to data bus 13. The flash PROM 18 includes initialization instructions for the computer system 10.

During start-up of the computer system 10, micro-code instructions stored in the flash PROM 18 are executed. The micro-code instructions include boot code that directs execution of particular boot blocks of the hard disk 16. Once the instructions contained in the boot blocks of the hard disk 16 are executed and loaded into the memory 15, higher level instructions and code are executed and loaded into memory 15 such as operating systems for Windows 95, Unix, or Macintosh based computers. The higher level instructions and code may be executed from a network server. Thus, in an alternative embodiment, computer system 10 is one of a number of computer systems coupled to a network.

In a network, the computer system 10 may not include the disk drive 16, as data transfers are through a network server. The network server includes wired network connections, RF (radio frequency) network connections, and IR (infrared) network connections. Other computer systems include hand held systems such as PDAs (Personal Data Assistants) and computer systems that include micro-code to initialize the computer system.

Figure 2:
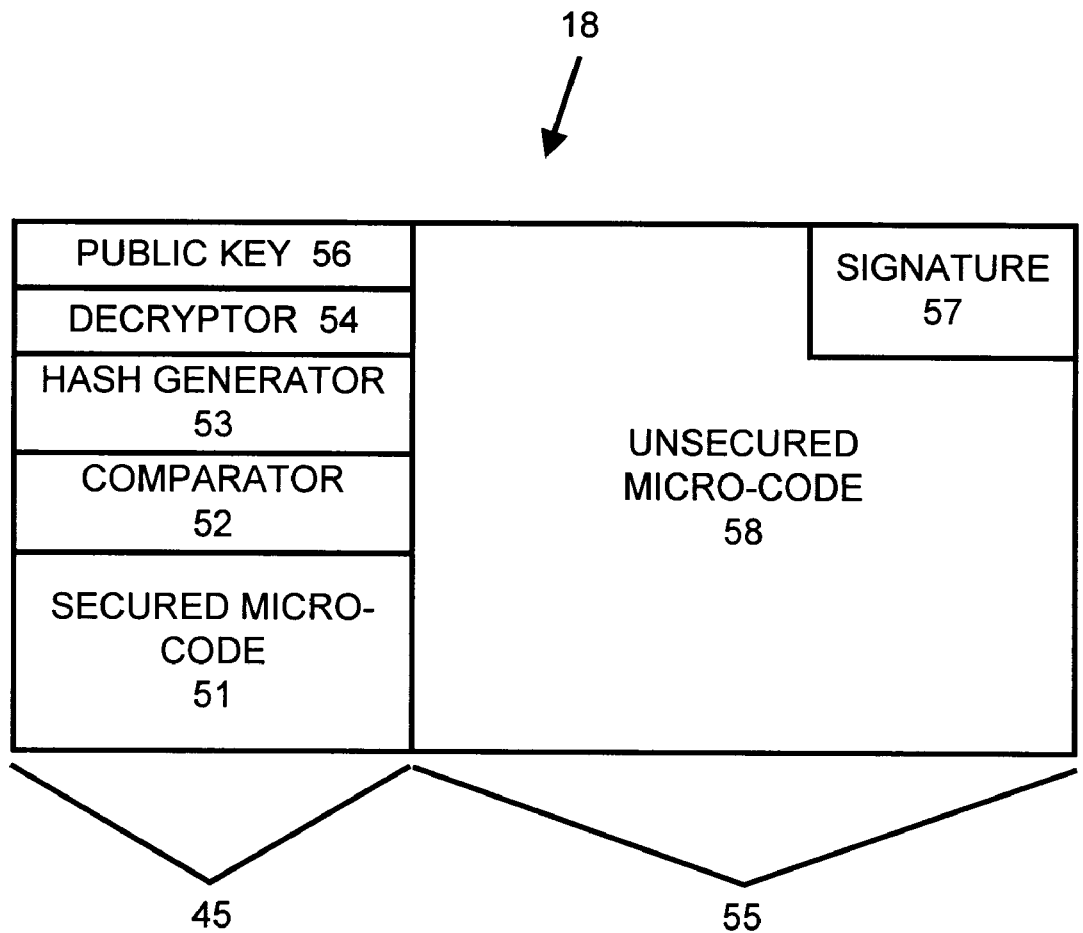
FIG. 2 illustrates a block diagram of a flash PROM of the computer system in accordance with the present invention.

FIG. 2 illustrates a block diagram of the flash PROM 18. The flash PROM 18 is divided into two main sections: a authentication section 45 and a programmable section 55. The authentication section 45 is a ROM (read-only memory). The micro-code instructions contained in the authentication section 45 are read-only. The micro-code instructions contained in the programmable section 55 are re-writable. For example, the programmable section 55 includes a flash memory that is software programmable with new micro-code.

The authentication section 45 authenticates the programmable section 55 to verify that the micro-code instructions which boot the computer system 10 are trusted because the programmable section 55 is software programmable. The authentication section 45 includes a plurality of secure micro-code 51, a comparator 52, a hash generator 53, a decryptor 54 and a public key 56. The unsecured section 55 includes a digital signature 57 and a plurality of unsecured micro-code 58.

During initialization of the computer system 10, the secure micro-code 51 of the authentication section 45 executes and directs the hash generator 53 to generate a data hash of the unsecured micro-code 58 programmed in the programmable section 55 of the flash PROM 18. The secure micro-code 51 also directs the decryptor 54 to calculate a verification hash. The decryptor applies the public key 56 of the authentication section 45 and the digital signature 57 of the programmable section 55 and calculates the verification hash.

Once the verification hash and the data hash are generated, the micro-code 51 directs the comparator 52 to compare the verification hash with the data hash. If the verification hash matches the data hash, the unsecured micro-code 55 is properly verified and permitted to execute. If the comparison of the verification hash and the data hash fails, the unsecured micro-code 58 is corrupted or had been altered without proper authorization.

Public-key cryptography verifies that the digital signature 57 and the public key 56 decrypts to a verification hash which matches the data hash of the micro-code programmed in the programmable section 55 of the flash PROM 18. The data hash generator 53 generates the data hash. A digital signature 57 of the programmable section 55 is provided when the programmable section 55 is programmed. During authorized programming of the programmable section 55, an initial hash from the authorized programming micro-code is generated. Next, a proper digital signature 57 is encrypted from a secret key and the initial hash of the authorized programming micro-code 58 using public key cryptography techniques. The proper digital signature 57 and the authorized programming micro-code 58 are written to the programmable section 55.

The authentication section 45 of the flash PROM 18 is initially programmed with the secure micro-code 51, the comparator 52, the hash generator 53, the decryptor 54, and the public key 56. Whenever the computer system 10 is initialized, the authentication section 45 verifies that the data hash of the unsecured micro-code 58 matches the verification hash to ensure the integrity of the unsecured micro-code 58 and authenticate that the unsecured micro-code 58 had not been altered. As the unsecured micro-code 58 of the programmable section 55 is authenticated, the trust level of the unsecured micro-code 58 is raised to a level of trusted. Thus, the authenticated micro-code 58 can be used to authenticate other initialization code down stream in the start-up sequence of the computer system 10.

Figure 3:
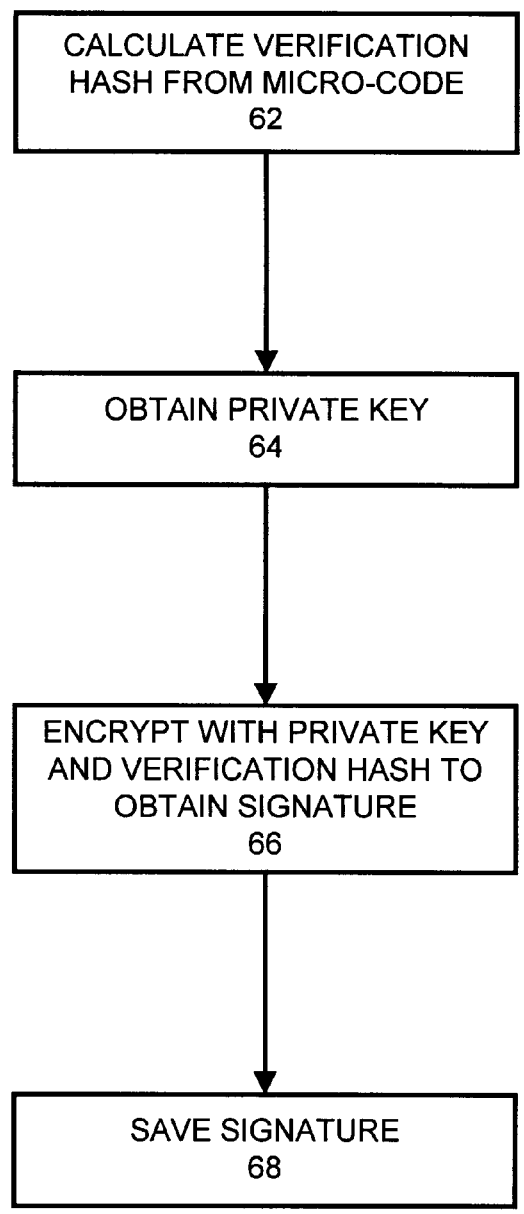
FIG. 3 illustrates a flow diagram for generating a signature in accordance with the present invention.

FIG. 3 shows a flow diagram for generating a digital signature 57 for the micro-code 58. The diagram begins with generation of the verification hash from the micro-code 58 in step 62. Next, the private key is obtained for the generation of a verification hash from the micro-code 58 in step 64. In step 66, the verification hash is encrypted using public key cryptography techniques and the private key to obtain the digital signature 57. Finally, in step 68, the digital signature 57 is programmed with the micro-code 58 to the programmable section 55 of the flash PROM 18.

Figure 4:
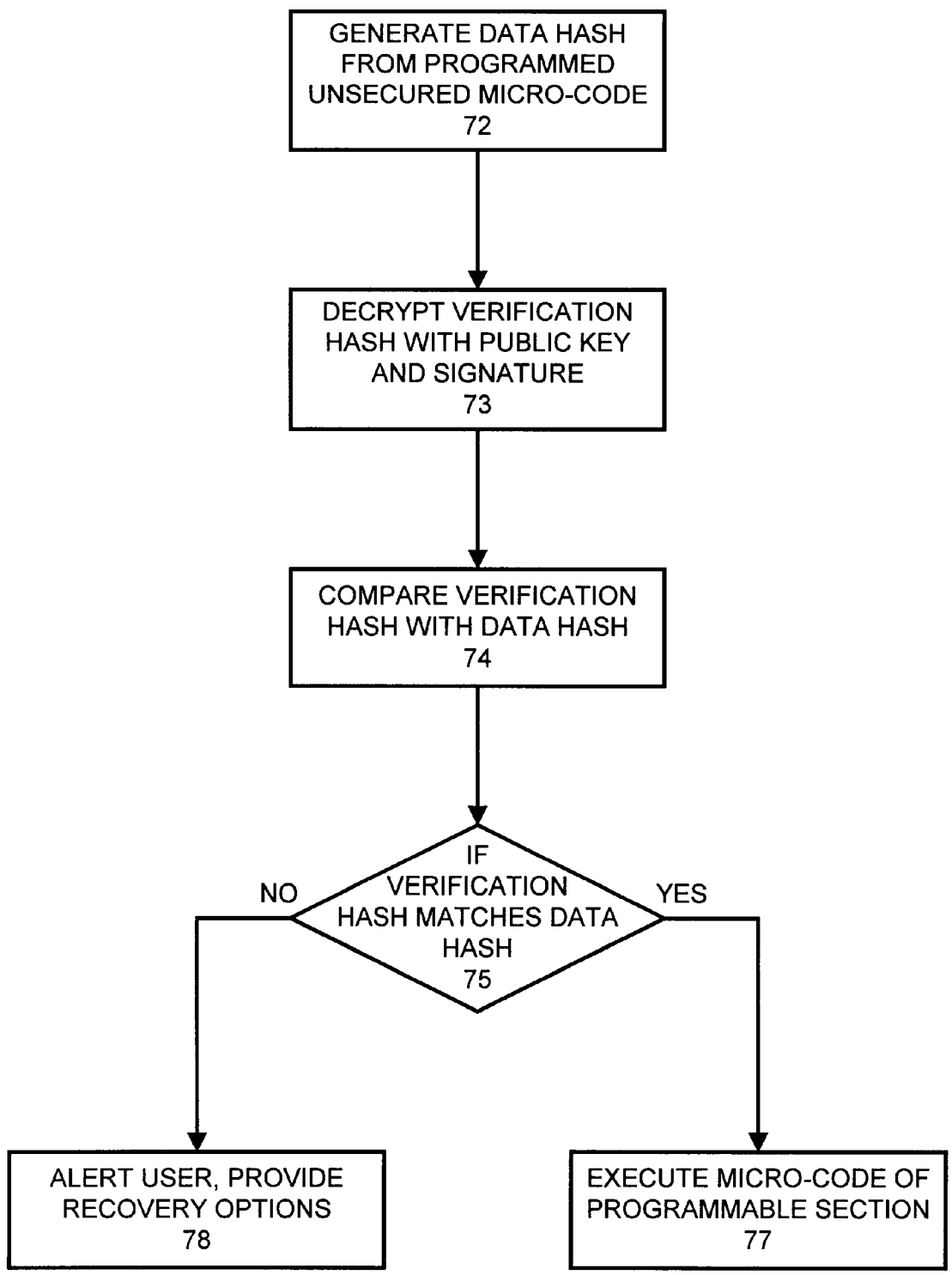
FIG. 4 illustrates a flow diagram for authenticating unsecured microcode of the programmable section of the flash PROM.

FIG. 4 shows a flow diagram for authenticating the unsecured micro-code 58 of the programmable section 55.

The diagram begins with generation of the data hash from the unsecured micro-code 58 contained in the programmable section 55 in step 72. In step 73, the verification hash is decrypted with the public key 56 contained in the authentication section 45 and the digital signature 57 contained in the programmable section 55. Step 74 provides a comparison of the verification hash with the data hash. In decision step 75, if the verification hash matches the data hash then step 77 authorizes the execution of the micro-code 58 contained in the programmable section 55. If in decision step 75, the verification hash does not match the data hash; step 78 provides a message to the user that an error occurred during authentication of the programmable section 55 and offers a recovery solution for the user to obtain valid micro-code.

A flash PROM 18 having an authentication section 45 and a programmable section 55 affords ease in updating the flash PROM 18 with new micro-code without compromising security. Implementing public-key cryptography having a private key and a public key to verify the programmable section 55 with the authentication section 45 assures that the programmable section of the micro-code is proper and authentic. The integrity of the unsecured micro-code 58 of the programmable section 55 is also verified when the verification hash matches the data hash. As the trust level of the unsecured micro-code 58 is raised to a level of trusted, other boot data such as the boot blocks of the disk drive 16 used for initializing the computer system 10 can be similarly authenticated using the now trusted micro-code 58 of the programmable section 55. Thus, a propagation of a series of security checks during the boot-up sequence can be implemented to ensure that each sequence executes properly authenticated boot code While the foregoing detailed description has described several embodiments of the apparatus and methods of firmware authentication in accordance with this invention, it is to be understood that the above description is illustrative only and not limiting of the disclosed invention. Obviously, many modifications and variations will be apparent to the practitioners skilled in this art. Accordingly, the apparatus and methods of firmware authentication has been provided which authenticates the programmable section of a flash PROM with a read-only section of the flash PROM by application of public-key cryptography. By affording a programmable section of the flash PROM to be software programmable, updates to the firmware are accomplished without compromising the integrity of the firmware. No longer are system operators required to disassemble computer systems to perform updates to system start-up firmware.

What is claimed is:

1. A boot PROM (programmable read only memory) having programming instructions for initializing a computer system containing the boot PROM, the boot PROM comprising:

a software programmable data section having a plurality of micro-code configured to initialize the computer system; and an authentication section having a hash generator configured to generate a data hash of the plurality of micro-code programmed in the software programmable data section, wherein the authentication section authenticates the plurality of micro-code with the data hash to authorize execution of the plurality of micro-code.

2. The boot PROM according to claim 1, wherein:

the software programmable data section includes a predetermined signature; and the authentication section includes a predetermined public key and a decryptor configured to provide a verification hash from the predetermined signature and the public key.

3. The boot PROM according to claim 2, wherein the authentication section includes a comparator configured to compare the data hash with the verification hash to authenticate the plurality of micro-code of the software programmable data section.

4. The boot PROM according to claim 2, wherein the predetermined signature includes an encryption of a private key and an initial hash of a plurality of initial micro-code programmed to the software programmable data section.

5. The boot PROM according to claim 1, wherein the authentication section includes a plurality of trusted micro-code configured to initiate execution of the plurality of micro-code of the software programmable data section in response to proper authentication of the plurality of micro-code.

6. The boot PROM according to claim 5, wherein the proper authentication of the micro-code programmed in the software programmable data section by the authentication section raises the plurality of micro-code to a level of trusted code.

7. The boot PROM according to claim 1, wherein the software programmable data section includes a flash memory configured to enable software reprogramming of the plurality of micro-code.

8. The boot PROM according to claim 1, wherein the authentication section includes a ROM (read only memory).

9. A method of operating a boot PROM (programmable read only memory) having programming instructions for initializing a computer system comprising the steps:

generating a data hash from a plurality of micro-code programmed in a software programmable data section of the boot PROM; and authenticating the plurality of micro-code of the software programmable data section in an authentication section of the boot PROM to authorize execution of the plurality of micro-code to initialize the computer system.

10. The method of operating a boot PROM according to claim 9, wherein:

the software programmable data section includes a predetermined signatures; and the step of authenticating includes generating a verification hash from the predetermined signature and a public key stored in the authentication section of the boot PROM.

11. The method of operating a boot PROM according to claim 10, wherein the step of authenticating includes comparing the data hash with the verification hash to authenticate the plurality of micro-code of the software programmable data section.

12. The method of operating a boot PROM according to claim 10 further comprising the step of encrypting with a private key an initial hash of a plurality of initial micro-code programmed to the software programmable data section to provide the predetermined signature.

13. The method of operating a boot PROM according to claim 9, wherein the authentication section includes a plurality of trusted micro-code, further comprising the step of:

propagating a level of trust to the plurality of micro-code of the software programmable data section in response to proper authentication of the plurality of micro-code.

14. The method of operating a boot PROM according to claim 9, wherein the software programmable data section includes a flash memory, further comprising the step of:

reprogramming the plurality of micro-code in the software programmable data section.

15. The method of operating a boot PROM according to claim 9 wherein the authentication section includes a ROM (read only memory).

16. A memory module for initializing a computer system, comprising:

a programmable section configured to store:
- a set of initialization instructions which, when executed by a processor, initialize a computer system in which the memory module and processor are installed; and
- a digital signature of said set of initialization instructions, wherein said digital signature is generated by encrypting a verification hash of said set of initialization instructions with a private encryption/decryption key; and a read-only section configured to store:
- a public encryption/decryption key corresponding to the private encryption/decryption key;
- a decryptor configured to decrypt said digital signature with said public encryption/decryption key to reproduce said verification hash;
- a hash generator configured to generate a test hash from said set of initialization instructions;
- a comparator configured to compare said test hash and said verification hash; and
- a set of trusted micro-code configured to execute before the computer system is operable by a user;

wherein, upon execution of said trusted micro-code, said initialization instructions are executed if said test hash matches said verification hash.

17. A method of initializing a computer system with authenticatable initialization instructions, comprising:

executing a set of trusted micro-code stored in a read-only portion of a memory module installed in the computer system before the computer system is operable by a user;

generating a test hash from a set of initialization instructions stored in a programmable portion of said memory module;

retrieving a digital signature from said reprogrammable portion of said memory module;

decrypting said digital signature with a public key stored in said read-only portion of said memory module to retrieve a verification hash of an initial set of initialization instructions stored in said programmable portion of said memory module;

comparing said test hash and said verification hash; and if said test hash and said verification hash match, executing said set of initialization instructions to initialize the computer system.

* * * * *

UNITED STATES PATENT AND TRADEMARK OFFICE
CERTIFICATE OF CORRECTION

PATENT NO : 6,138,236
DATED : October 24, 2000
INVENTOR(S): Mirov et al.

It is certified that errors appear in the above-identified patent and that said Letters Patent is hereby corrected as shown below:

In claim 10 (at column 6, line 44), replace "signatures" with --signature--.

Signed and Sealed this

Eighth Day of May, 2001

Attest:

NICHOLAS P. GODICI

*Attesting Officer*      *Acting Director of the United States Patent and Trademark Office*